Dec. 14, 1948.        F. M. ORR         2,456,310
OPERATION OF A FLUID CATALYTIC CONVERSION UNIT
Filed April 9, 1947
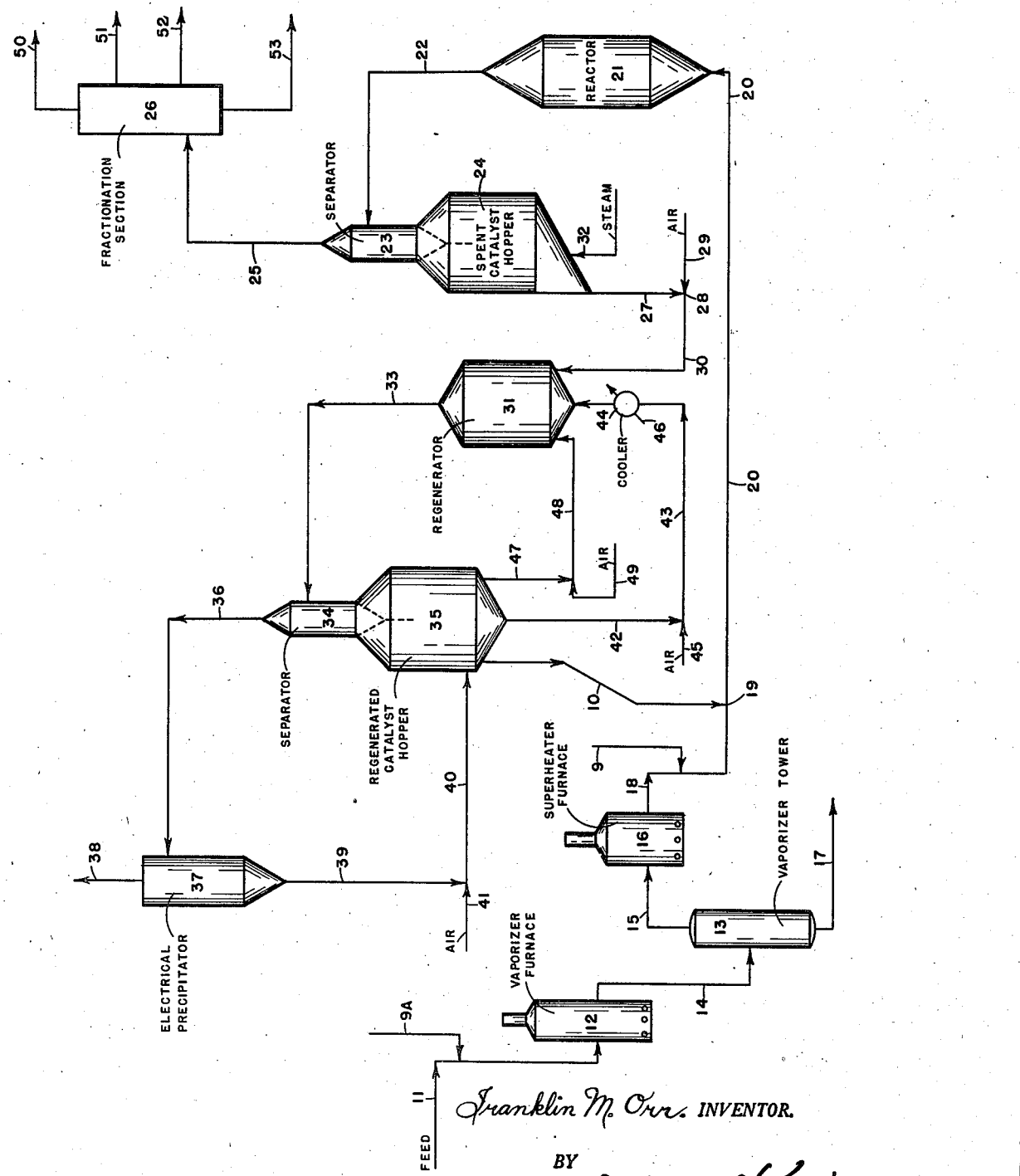
Franklin M. Orr, INVENTOR.
BY
J. S. McKean
ATTORNEY.

Patented Dec. 14, 1948

2,456,310

UNITED STATES PATENT OFFICE 2,456,310

OPERATION OF A FLUID CATALYTIC CONVERSION UNIT

Franklin M. Orr, Baytown, Tex., assignor, by mesne assignments, to Standard Oil Development Company, Elizabeth, N. J., a corporation of Delaware Application April 9, 1947, Serial No. 740,301

10 Claims. (Cl. 196—52)

This invention is directed to a method for operating a fluid catalytic conversion unit. More particularly, it is directed to a method for shutting down and starting up an upflow type of fluid catalytic conversion unit wherein the material to be converted and the catalyst are removed in admixture from the upper portion of the reactor.

In a fluid catalyst unit of the type described, regenerated catalyst is circulated in a closed circuit which includes a reactor, a spent catalyst hopper, a regenerator, and a regenerated catalyst hopper. During operation, the mixture of material to be converted and regenerated catalyst is passed through the reactor and the converted material and catalyst pass then into the spent catalyst hopper where the catalyst is separated and the converted material passed to a purification stage. The spent catalyst then passes to the regenerator where it is contacted with air for the combustion of carbon deposited on the catalyst particles, the mixture of catalyst and flue gas being conducted to the regenerated catalyst hopper in which the catalyst is separated from the flue gas, and is retained for re-use. Heretofore, during shutting down and starting up operations on units of this type, the refractory lining of the regenerator has sustained serious damage caused by surging of the catalyst mass within the vessel due to abnormal air and catalyst velocities and to high inventories of catalyst in the regenerator. A substantial inventory of catalyst is usually maintained within the regenerator vessel and air for combustion is passed into the mass through a grid in the lower portion of the vessel. The distribution of air for fluidization of the catalyst is dependent upon the pressure drop through the grid which in turn is dependent to a certain extent upon the quantity of catalyst which is entrained with the air passing through the grid. Relatively high pressure drops of the order of 0.5 to 1.0 pound per square inch are desirable. In the past, shutting down operations have resulted in sudden increases in regenerator inventory with the consequent necessity for reducing air injection rates to avoid carrying the catalyst out of the regenerator vessel. The surging of the catalyst mass within the vessel, caused by poor fluidization, in many cases results in complete destruction of the lining in the lower portion of the vessel which in turn requires substantial downtime for repair.

It is the main object of this invention, therefore, to provide a method for operating an upflow type fluid catalyst unit in such a manner that damage to the refractory lining of the regenerator vessel during shutting down and starting up periods of operation is substantially eliminated.

The objects of this invention are achieved by careful control of a number of operation variables. I have found that surging within the regenerator vessel may be substantially eliminated during shutting down and starting up operations with a corresponding elimination of damage to the refractory lining by controlling the velocity in the regenerator, the amount of catalyst above the distributing grid in the regenerator, the pressure drop through the grid, and the catalyst rate, within certain limits as will be described later. Contrary to the former shutting down procedure of discontinuing catalyst circulation and feed injection simultaneously, according to my invention, catalyst circulation will continue for several hours after feed injection has been stopped. Similarly, during starting up operations, instead of starting catalyst circulation and feed injection simultaneously, catalyst circulation will be established and operating inventories of catalyst will be created in the various vessels before feed material is charged to the system. To maintain circulation through the reactor under such conditions, steam or inert gas will be convenient for fluidization of the catalyst in the reactor, and control of the steam velocity, temperature, and the amount of catalyst recirculated through the reactor will be required.

It has been customary in the past upon shutting down a fluid catalyst unit of the upflow type to reduce progressively the oil and catalyst rate through the reactor until the flow of both oil and catalyst is completely stopped. Just prior to this point steam is injected into the reactor to carry the charge of catalyst out of the reactor and into the spent catalyst hopper. Steam injection is continued for a period of time sufficient to purge the remaining reaction products from the reactor. The spent catalyst hopper is usually not large enough to retain the catalyst content of the reactor and, since it is operated by level control to maintain as low an inventory as possible to minimize the deactivating effects of steam which is used for stripping the spent catalyst, the quantity of catalyst entering the regenerator during this period is substantially equal to the catalyst content in the reactor. As a consequence of this sudden increase in flow of catalyst to the regenerator, the regenerator holdup rises sharply and in order to prevent unregenerated catalyst from being carried out of the regenerator to the regenerated catalyst hopper, it is necessary to reduce the rate of air injection. This results in a reduction in the pressure drop through the distribution grid beneath the catalylst bed with a corresponding decrease in fluidization efficiency. Since the distribution of air through the grid is a function not only of the air rate but also of the catalyst rate, this situation is aggravated by the fact that less regenerated catalyst is required to be circulated for cooling the regenerator bed after the flow of spent catalyst into the regenator has stopped. The net result of the combination of these effects is very poor distribution through the grid and a substantial amount of surging of the relatively large volume of catalyst within the regenerator which causes the refractory lining of the regenerator to become dislodged and, in many cases, to be completely torn away from walls of the vessel.

According to my invention, when it is desired to discontinue the operation of the unit of the type described, instead of reducing the oil and catalyst rate to the reactor simultaneously, the oil rate is discontinued and steam is admitted to the reactor to fluidize the catalyst within the reactor but not in sufficient quantity to discharge the entire catalyst content to the spent catalyst hopper. This technique is particularly advantageous on emergency shutdowns since the oil can be cut out of the reactor very quickly and there is no necessity for immediately transferring the catalyst which is in the reactor over to the regenerator.

During the period of operation after the oil flow has been discontinued, the catalyst rate is reduced and the steam rate is adjusted to maintain a substantially normal operating level within the reactor without exceeding the maximum allowable metal temperatures of the reactor. Obviously, since no endothermic reaction is taking place, no heat is absorbed from the catalyst and the only cooling which occurs in the reactor is due to the lower temperature of the steam than of the catalyst. It has been found that a steam velocity of 1.2–1.6 feet/second is required for satisfactory operation of the reactor in this manner. The inlet steam temperature is held at approximately 400° F. and the reactor catalyst rate is adjusted to hold the reactor temperature between 900° F. and the maximum allowable temperature on the vessel. Obviously, since it is desirable to maintain the catalyst circulation rate through the reactor at as high a level as possible, the temperature of the steam used for fluidizing the catalyst in the reactor should be held as low as possible. Although a temperature of approximately 400° F. has been mentioned, it is to be understood that saturated steam at pressures only slightly above atmospheric would be suitable provided the pressure drop through the reactor and other vessels is sufficiently low. The use of lower temperature steam has the added advantage that less steam is required per unit weight of catalyst circulated and thus the catalyst circulation rate may be increased without excessive entrainment in the steam leaving the reactor. Under the conditions described, the catalyst circulation rate will be equivalent to about 10 to 30% of that employed during onstream conditions.

Circulation of catalyst through the reactor in the manner described above will continue for a period of several hours, during which catalyst is transferred from the regenerated catalyst hopper to the catalyst storage hoppers which are used to hold the catalyst when the entire catalyst content of the unit must be discharged before a complete shutdown. Discharge of the catalyst in this manner permits a reduction in the inventory of the catalyst in the regenerator to a point such that when the catalyst from the reactor is transferred to the regenerator the total inventory in the regenerator will not exceed 700 to 800 pounds of catalyst per square foot of cross sectional area. When the catalyst inventory in the regenerator is sufficiently low to permit this transfer, catalyst recirculation through the reactor is discontinued and the steam rate is increased to carry the catalyst out of the reactor into the spent catalyst hopper. At the end of this operation the spent catalyst hopper will be emptied into the regenerator and, since the inventory in the regenerator will be within the limits previously described as satisfactory for continuous operation, it will be possible to maintain satisfactory air distribution in the regenerator to avoid surging.

The recirculation of catalyst through the reactor during the shutting down period serves a dual purpose. First, it permits employing the reactor and the spent catalyst hopper as a reservoir until a sufficient quantity of catalyst can be discharged to the storage hoppers to allow the complete transfer of catalyst to the regenerator without realizing abnormally high inventories. Also, the flow of catalyst through the grid in the regenerator greatly improves the distribution of air and catalyst and hence contributes to better fluidization of the catalyst in the regenerator.

The conventional starting up procedure for a unit of the type described comprises first building up a sufficient inventory of catalyst in the regenerator, by transferring catalyst from the storage hoppers, to permit the creation of operating inventories in the reactor and other vessels in the catalyst circuit, without entirely emptying the regenerator. As soon as these inventories are established, which may require 15 to 30 minutes, feed injection is started and additional catalyst is transferred from the storage hoppers to the regenerator to increase the catalyst inventory in the regenerator to the desired operating level. In order to avoid reducing the regenerator catalyst inventory to a level too low for satisfactory operation when catalyst circulation is established, it is not uncommon practice to increase this inventory to a value substantially above the desired operating level of 700 to 800 pounds per square foot of cross sectional area as mentioned heretofore. Such conditions are favorable to catalyst surging in the regenerator with accompanying damage to the regenerator lining.

In accordance with the present invention, instead of depleting the regenerator catalyst inventory in starting up, catalyst circulation through the reactor and other vessels in the cycle is started at a low rate and gradually increased over a period of a few hours during which time the addition of catalyst to the regenerator from the storage hoppers will be controlled to hold the regenerator inventory substantially constant at the safe operating level.

The methods whereby the control of the several variables previously mentioned is effected will be more clearly understood from the following description of the operation of an upflow fluid catalyst hydrocarbon conversion unit which illustrates one type of unit to which the practice of my invention may be applied and which is given in conjunction with the drawing, the sole figure of which is a simplified flow diagram.

Referring now to the drawing, numeral 11 designates a line by which the raw charging stock is transported from a suitable reservoir beyond the limits of the unit to the vaporizer furnace 12, in which sufficient heat is added to the raw charging stock to cause evaporation of that portion of the charging stock which is desired to be converted. The heated mixture flows from vaporizer furnace 12 to vaporizer tower 13 by way of line 14. Vaporizer tower 13 contains only a few small disc and dough-nut type baffles in the lower section. The vaporized portion of the feed is disengaged in vaporizer tower 13 and passes through line 15 to the superheater furnace 16 in which the temperature of the vapor is superheated prior to the conversion process. The bottoms from the vaporizer tower 13 pass out of the system through line 17 to by-product storage not shown. The superheated reaction material passes through line 18 to a point 19 where regenerated catalyst is added to the stream from line 10. The mixture of catalyst and vaporized reaction material then flows through line 20 to reactor 21 in which the conversion of the reaction material takes place. During starting up and shutting down periods, steam admitted to line 18 through line 9 or to line 11 through line 9—A is substituted for the hydrocarbon vapors flowing to the reactor. A dense phase of catalyst particles is retained in the lower portion of the reactor because of the reduction in velocity of the reaction mixture passing through this vessel, and the conversion product plus entrained catalyst is passed in admixture from reactor 21 through line 22 to a separator 23 which is located in the upper portion of the spent catalyst hopper 24. The conversion product which is still a vapor is separated from the entrained catalyst particles and passes from the separator through line 25 to the fractionation section 26. The separated catalyst particles are drained from the separator into the spent catalyst hopper 24 and then pass from the bottom of the spent catalyst hopper through line 27 to a point 28 at which air is injected into the catalyst stream by way of line 29. The air not only transports the catalyst through line 30 to regenerator 31, but also supplies oxygen for combustion of the carbon which has been deposited upon the catalyst particles during their residence in reactor 21. The spent catalyst hopper 24 contains a small amount of the reaction product which is stripped from the catalyst particles by injecting steam through line 32.

A mixture of regenerated catalyst and flue gas passes from regenerator 31 through line 33 to separator 34 which is situated in the upper portion of the regenerated catalyst hopper 35. The catalyst is separated from the flue gas in separator 34, and the flue gas is discharged through line 36 to an electrical precipitator 37 and finally to the atmosphere through line 38. The small quantity of catalyst which is entrained with the flue gas in line 36, and which is separated in electrical precipitator 37 is returned to the regenerated catalyst hopper through lines 39 and 40 by means of air injected through line 41. The catalyst which is separated from the flue gas in separator 34 is drained into the regenerated catalyst hopper and there remains as a reservoir for re-use by discharging through line 10 to point 19 for admixture with the superheated reaction material. A considerable amount of heat is released in the carbon combustion reaction within the regenerator. Excessive temperature rise in the regenerator catalyst bed is prevented by circulating, by means of a stream of air, a desired quantity of regenerated catalyst from the regenerated catalyst hopper 35 through lines 42 and 43 and cooler 44 into the lower portion of the regenerator. Air for effecting movement of this catalyst is injected by way of line 45. Cooler 44 is of the conventional type and transfers heat to a circulating medium which in turn is used to supply heat to other parts of the process such as the fractionation section. The heat absorbing medium flows to the cooler in line 46. Another stream of catalyst is transferred from the regenerated catalyst hopper 35 to the regenerator 31 through lines 47 and 48 for the purpose of controlling the level of catalyst in the regenerator. Transfer of this portion of catalyst is effected by means of injecting air through line 49. The fractionation section is shown only as a block 26 on the drawing and contains a number of fractionating towers equipped with bell caps for securing vapor liquid contact, means for supplying heat for reboiling, and means for supplying reflux for fractionation. The conversion product flowing through line 25 is separated by distillation in the fractionation section 26 into products 50, 51, 52, and 53, having different boiling ranges. A small amount of catalyst is entrained from the separator 23 into line 25 along with the conversion product. This catalyst leaves the fractionation section 26 in product 53 and is subsequently separated, in equipment not shown, and may be discarded or recycled as desired.

It will be obvious that the distribution of catalyst throughout the system may be controlled during normal operation by suitable adjustment of air and steam rates and valves controlling flow of catalyst, that is to say, the inventory in the several vessels and the rate of flow of catalyst in the several recycle streams may be adjusted. It has been found that the best conditions for operation of the regenerator consist in maintaining a velocity in the vessel of 2.7–3.1 feet per second of either air or an air-steam mixture, a maximum holdup of catalyst above the grid of 700 to 800 pounds per square foot of cross sectional area of vessel, a pressure drop through the grid of 0.5–1.0 pound per square inch and a catalyst rate equal to the reactor catalyst rate plus sufficient by-pass catalyst to maintain the pressure drop through the grid, requiring a density at the grid of 0.5–0.6 pound of catalyst and air per cubic foot of flowing medium. These conditions have been found satisfactory in continued operation over long periods of time in the type of unit described and if adhered to will prevent surging and abnormal movement of the catalyst in the regenerator which is responsible for destruction of the regenerator lining.

It is easily recognized that high catalyst inventories in the regenerator and poor air distribution for fluidization would result in damage to the lining, irrespective of whether a unit is being shut down or started up, as long as the bed is maintained in a fluidized state. While the advantages of my invention have been described with greater emphasis on a shutting down procedure for a fluid catalyst unit, it will be obvious to the skilled worker that the beneficial effects may also be realized during starting up operations. It is true that damage to the regenerator lining is less frequent during starting up operations than in shutting down operations; however, damage during this period is not uncommon and proper control of the several variables previously discussed will avoid such damage. In order to achieve these results, catalyst circulation would be started and fluidization of a bed of catalyst in the reactor fully established by the use of steam before any oil is injected for conversion.

The beneficial effects of my invention will be further illustrated by a specific example wherein the methods of this invention were applied to a commercial upflow type fluid catalytic cracking unit. The maximum regenerator holdup in this unit was set at 140 tons above the grid in a vessel having a diameter of 22 feet. The air rate was 35,000 standard cubic feet per minute corresponding to a velocity in the range of 2.7 to 3.1 feet per second. Catalyst circulation during normal operation was 15–20 tons per minute and this was reduced to 2–5 tons per minute during the shutting down operation when no oil was being fed to the reactor. Steam injection into the reactor amounted to approximately 25,000 pounds per hour resulting in a reactor velocity of 1.3–1.6 feet per second. The inlet temperature of the steam was held at 400° F. and the reactor temperature varied between 900° and 975° F. During the emergency shutdown, oil was cut out of the reactor and steam was immediately injected to fluidize the catalyst. The inventory in the spent catalyst hopper was increased and the discharge of regenerated catalyst to the catalyst storage hoppers was begun in order to reduce the inventory in the regenerator. Finally the inventory of the regenerated catalyst hopper was again reduced to the normal level and the catalyst content of the reactor and spent catalyst hopper was transferred to the regenerator without exceeding the 140 tons holdup previously set as a maximum. Although the regenerator lining had failed completely during 7 of the 9 previous shutdowns and had sustained damage during the remaining two shutdowns, the lining was in good condition after the unit was shut down in accordance with the procedure outlined above.

While this invention has been described with reference to a fluid catalytic cracking unit, it is to be understood that the methods of this invention would be applicable to any operation wherein a fluidized powdered catalyst is used and in which problems similar to those described are encountered, for example, in a fluid catalyst Fischer-Tropsch process for synthetic petroleum production from carbon monoxide and hydrogen.

The nature and objects of the present invention having been fully described and illustrated, what I wish to claim as new and useful and to secure by Letters Patent is:

1. In a shutting down procedure for a catalytic conversion unit in which a fluidized powdered catalyst is continuously circulated during the conversion process through a reaction zone, a spent catalyst retention zone, and a regeneration zone and in which hydrocarbon is fed to the reaction zone, the steps of discontinuing the supply of hydrocarbon to the reaction zone while maintaining the flow of catalyst to said reaction zone, admitting a quantity of steam to said reaction zone at a temperature below the conversion temperature in said zone sufficient to maintain the catalyst in a fluidized state, discontinuing the flow of catalyst to the reaction zone and increasing the flow of steam to the reaction zone to transfer the catalyst contained therein to said spent catalyst retention zone, transferring said spent catalyst from said retention zone to the regeneration zone while maintaining an average fluid velocity in the regenerator vessel within the range of 2.7 to 3.1 feet per second and the amount of catalyst in the regenerator vessel below 800 pounds per square foot of cross sectional area of the vessel.

2. A procedure in accordance with claim 1 in which the quantity of steam employed in the reaction zone for fluidization of the catalyst contained therein is adjusted to obtain an average fluid velocity in said reaction zone in the range of 1.3 to 1.6 feet per second.

3. A procedure in accordance with claim 1 in which the temperature of the steam employed for fluidization of the catalyst in said reaction zone is in the range of 250° to 400° F.

4. In a shutting down procedure for a catalytic conversion unit in which a fluidized powdered catalyst is continuously circulated during a conversion process in a closed cycle through a reaction zone, a spent catalyst retention zone, a regeneration zone, and a regenerated catalyst retention zone and in which hydrocarbon is fed to the reaction zone, the steps of discontinuing the supply of hydrocarbon to the reaction zone while maintaining the flow of catalyst from the regenerated catalyst retention zone to said reaction zone, admitting a quantity of steam to said reaction zone sufficient to maintain the catalyst mass in the reaction zone in a fluidized state, removing catalyst from the regeneration zone at a rate greater than that at which the catalyst is transferred to the regeneration zone from the reaction zone to reduce the catalyst inventory in the regeneration zone, discontinuing the flow of catalyst to the reaction zone and increasing the flow of steam to the reaction zone to transfer the catalyst contained therein to said spent catalyst retention zone, transferring said spent catalyst from said retention zone to the regeneration zone while maintaining the average fluid velocity in the regeneration zone within the range of 2.7 to 3.1 feet per second and the amount of catalyst in the regeneration zone below 800 pounds per square foot of cross sectional area of the zone, and transferring the regenerated catalyst from said regeneration zone to said regenerated catalyst retention zone.

5. In a shutting down procedure for a catalytic conversion unit in which a fluidized powdered catalyst is continuously circulated during the conversion process through a reaction zone, a regeneration zone and a regenerated catalyst retention zone, said regeneration zone comprising a vessel and equipped with a distributing means for uniformly distributing catalyst-air admixture and through which the spent catalyst and recycled regenerated catalyst and air for regeneration enter the regeneration zone, the steps of maintaining the pressure drop through the distributing means in the regenerator vessel in excess of 0.5 pound per square inch, the amount of catalyst in the regenerator vessel below 800 pounds per square foot of cross sectional area of the vessel, the average fluid velocity in the regenerator vessel within the range of 2.7 to 3.1 feet per second and the density of the air-catalyst mixture flowing through the distributing means into the regeneration zone in excess of 0.5 pound of catalyst and air per cubic foot of flowing mixture.

6. A procedure as defined in claim 5 in which the density of the catalyst-air mixture entering the distributing means in the regenerator vessel is adjusted by the quantity of regenerated catalyst recycled to the regeneration zone from the regenerated catalyst retention zone.

7. In a shutting down procedure for a catalytic cracking unit in which a fluidized powdered catalyst is continuously circulated during the conversion process through a reaction zone, a regeneration zone, and a regenerated catalyst retention zone, said regeneration zone comprising a vessel equipped with a distributing means for uniformly distributing air and catalyst and through which catalyst and regeneration air enter the regeneration zone, the steps of maintaining the pressure drop through the distributing means in the regenerator vessel in the range of 0.5 to 1.0 pound per square inch, the amount of catalyst in the regenerator vessel in the range of 700 to 800 pounds per square foot of cross sectional area of the vessel, the average fluid velocity in the regenerator vessel in the range of 2.7 to 3.1 feet per second, and the density of the air-catalyst mixture flowing through the distributing means in the range of 0.5 to 0.6 pound of catalyst and air per cubic foot of the mixture.

8. In a shutting down procedure for a catalytic cracking unit in which a fluidized powdered catalyst is continuously circulated during the conversion process in a closed cycle through a reaction zone, a spent catalyst retention zone, a regeneration zone, and a regenerated catalyst retention zone, and in which a hydrocarbon oil is fed to the reaction zone and in which spent catalyst is regenerated with air in the regeneration zone, said regeneration zone being provided with a means for distributing the flow of catalyst and air into the mass of catalyst undergoing regeneration and a means for recycling a portion of the regenerated catalyst from the regenerated catalyst retention zone back to the regeneration zone said regeneration zone also being supplied with air for regeneration in admixture with spent catalyst and regenerated catalyst which enter the regeneration zone by passing upwardly through the distributing means, the steps of discontinuing the flow of hydrocarbon feed to the reaction zone, continuing the flow of regenerated catalyst to the reaction zone at a rate below that which is employed during the conversion process, admitting steam to the reaction zone in an amount sufficient to obtain an average fluid velocity in the reaction zone in the range of 1.3 to 1.6 feet per second, discontinuing the flow of regenerated catalyst to the reaction zone, increasing the quantity of steam injected into the reaction zone to cause transfer of the catalyst from the reaction zone to the spent catalyst retention zone, stripping the spent catalyst residing in the spent catalyst retention zone with steam, transferring the catalyst from the spent catalyst retention zone to the regeneration zone at a rate to maintain the inventory of catalyst in the regeneration zone in the range of 700 to 800 pounds per square foot of cross sectional area of the regenerator vessel, continuing the regeneration process in the regeneration zone at a rate to maintain the fluid velocity in the regenerator vessel in the range of 2.7 to 3.1 feet per second, transferring regenerated catalyst from the regenerator to the regenerated catalyst retention zone and recycling regenerated catalyst from the regenerated catalyst retention zone to the regeneration zone in an amount sufficient to maintain a fluid density of the air-catalyst mixture entering the distributing means in the range of 0.5 to 0.6 pound of catalyst and air per cubic foot of air-catalyst mixture.

9. In a starting up procedure for a catalytic conversion unit which comprises a regeneration zone, a reaction zone, and a storage zone for active catalyst and in which a fluidized powdered catalyst is continuously circulated through the reaction zone and the regeneration zone and in which hydrocarbon is fed to the reaction zone, the steps of circulating catalyst with a gasiform fluid through the reaction zone and the regeneration zone, providing an operating inventory of catalyst in the reaction zone, and transferring catalyst from the catalyst storage zone to the regeneration zone while maintaining a gasiform fluid velocity in the regeneration zone within the range of 2.7 to 3.1 feet per second and catalyst inventory in the regeneration zone below 800 pounds of catalyst per square foot of cross sectional area of the vessel, and feeding hydrocarbon to the reaction zone.

10. In a starting up procedure for a catalytic conversion unit in which a fluidized powdered catalyst is continuously circulated during the conversion process through a reaction zone, a regeneration zone, and a regenerated catalyst retention zone and in which hydrocarbon is fed to the reaction zone and in which active catalyst is transferred from a storage zone to the generation zone, said regeneration zone comprising a vessel adapted to burn carbon from the catalyst with air and which is equipped with a means of distributing the flow of a catalyst-air admixture into the mass of powdered catalyst undergoing regeneration and is permeable to both air and catalyst the steps of circulating catalyst with a gasiform fluid to provide an operating inventory of catalyst in each zone in the circulating system, maintaining the pressure drop through the distributing means in the regeneration zone in the range of 0.5 to 1.0 pound per square inch, the average fluid velocity in the regenerator vessel in the range of 2.7 to 3.1 feet per second, and the density of the air-catalyst mixture flowing through the distributing means in the range of 0.5 to 0.6 pound of catalyst and air per cubic foot of mixture, transferring active catalyst from the storage zone to the regeneration zone to maintain the amount of catalyst in the regenerator vessel in the range of 700 to 800 pounds per square foot of cross sectional area of the vessel and charging hydrocarbon to the reaction zone.

FRANKLIN M. ORR.

REFERENCES CITED

The following references are of record in the file of this patent:

UNITED STATES PATENTS

| Number | Name | Date |
| --- | --- | --- |
| 2,302,209 | Goddin, Jr. | Nov. 17, 1942 |
| 2,391,366 | Tyson | Dec. 18, 1945 |